Dec. 31, 1968    A. E. SCHMIDLIN ET AL    3,419,028
FLUID OSCILLATOR
Filed Sept. 7, 1965

ALBERTUS E. SCHMIDLIN
CHARLES W. BING
INVENTORS

BY

Thomas W. Kennedy
ATTORNEY

United States Patent Office 3,419,028
Patented Dec. 31, 1968

3,419,028
FLUID OSCILLATOR
Albertus E. Schmidlin, Caldwell, and Charles W. Bing, Irvington, N.J., assignors to General Precision Systems Inc., a corporation of Delaware
Filed Sept. 7, 1965, Ser. No. 485,210
5 Claims. (Cl. 137—81.5)

ABSTRACT OF THE DISCLOSURE

This invention provides a fluid oscillator comprising a peripheral wall having a longitudinal axis and having a radially inner surface with an inlet port facing radially inwardly, and comprising a pair of end walls with respective axially inner faces together with said peripheral wall forming a resonance cavity, and one of said end faces having a center portion with at least one outlet port facing axially inwardly.

---

The present invention relates to fluid oscillators, and particularly to a gas oscillator with no moving parts.

A conventional gas oscillator has a peripheral wall and pair of end walls forming a chamber, the walls having an inlet port and an outlet port and supporting a vibrating vane disposed in said chamber.

One problem with said conventional gas oscillator is that the gas-oscillator vibrating vane is subject to damages caused by shock loads and vibration loads.

In accordance with one embodiment of the present invention, damages caused by shock loads and vibration loads are substantially avoided by using a gas oscillator which has no moving parts.

Accordingly, it is one object of the invention to provide a gas oscillator in which moving parts are substantially eliminated and in which damages caused by shock loads and vibration loads are substantially avoided.

It is another object of the invention to provide a gas oscillator according to the aforementioned object, which can be used as the basic component of a gas temperature indicator, which can be used as the basic component of a gas impurity analyzer, and which can also be used as the basic component of a gyroscope.

It is a further object of the invention to provide a gas oscillator according to the aforementioned objects, which can generate an analog type of input signal, and which can generate a digital type of output signal.

To the fulfillment of these and other objects, the invention provides a fluid oscillator comprising a peripheral wall, which has a longitudinal axis and which has a radially-inner surface with an inlet port facing radially inwardly, and comprising a pair of end walls, which have respective axially-inner faces that together with said peripheral wall form a resonant cavity, with one of said faces having a center portion with at least one outlet port facing axially inwardly.

Other objects of the invention will become apparent upon reading the annexed detailed description in connection with the drawings, wherein like parts are designated by like numerals throughout the several views, and wherein.

Figure 1:
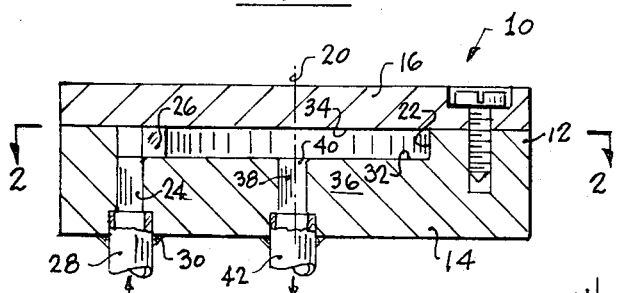
FIG. 1 is a sectional view of a gas oscillator embodying features of the present invention.

Referring to FIG. 1, one embodiment of the present invention is an oscillator disk 10, which has peripheral wall 12 and a pair of end walls 14, 16, that together form and enclose a resonance cavity or chamber 18 therebetween.

Figure 2:
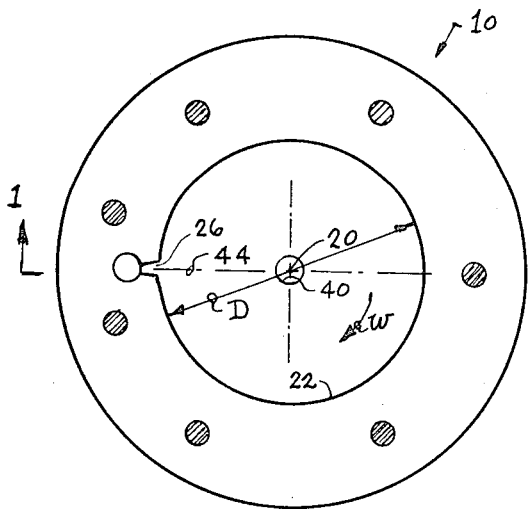
FIG. 2 is a sectional view taken along the line 2—2 of FIG. 1.

Peripheral wall 12 (FIGS. 1, 2) has a longitudinal axis 20 and has a radially-inner surface 22. Wall 12 has an inlet passage means 24, which has an inlet port 26 connecting to cavity 18. Wall 12 also has an exterior inlet tube 28 which connects to passage 24 for supplying cavity 18. Tube 28 has a seal means 30, such as solder or weld, to minimize leakage therefrom.

End walls 14, 16 (FIGS. 1, 2) respectively have axially-inner end faces 32, 34, which are flat and parallel to each other for minimizing eddy currents of gas in cavity 18. Wall 32 has a center portion 36 with a passage means 38. Passage 38 has an outlet port 40, which connects to cavity 18. Wall 32 also has an exterior outlet tube 42, which connects to passage 38 for flow from cavity 18. Tube 42 also has seal means 30 to minimize leakage therefrom.

Cavity 18 (FIGS. 1, 2) has an average thickness T, which is the average distance between faces 32, 34 adjacent to axis 20. Cavity 18 also has an average diameter or width D. For ease of manufacture, surface 22 has a cylindrical profile and width D is the diameter of surface 22. Thickness T and width D are used as parameters for ease of design of cavity 18. Thickness T is preferably in the range between 1% to 25% of diameter D. In this way, cavity 18 has a flat or planar-type of gas flow pattern between inlet port 26 and outlet port 40.

Figure 3:
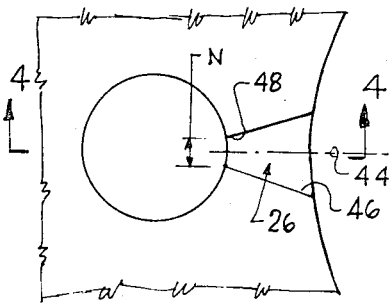
FIG. 3 is an enlarged view of a portion of FIG. 2.
Figure 4:
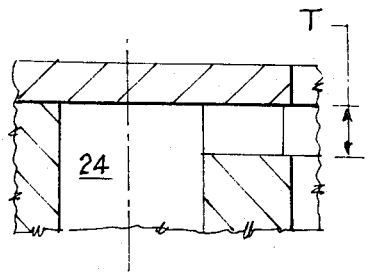
FIG. 4 is a sectional view taken along the line 4—4 of FIG. 3.

Port 26 (FIGS. 3, 4) has an inlet axis 44, which preferably intersects axis 20 substantially at right angles thereto in order to minimize impinging of gas flow on said end faces 32, 34. Surface 22 is symmetrical in profile about axis 44 in order to provide a symmetrical gas flow pattern and flow path in cavity 18 between inlet 26 and outlet 40. Port 26 has an opening portion 46, which extends through surface 22; and has a throat or neck portion 48, which is substantially smaller in cross-sectional area than port 46 whereby inlet 26 flares outward between throat 48 and port opening 46. Throat 48 also has a substantially smaller cross-sectional area than passage 24. Throat 48 has a height equal to cavity thickness T; and has a width N. Thickness T and width N define a cross-sectional area of throat 48, said area also being used as a parameter for designing cavity 18. Such inlet throat area is preferably in the range between 0.2% to 3.0% of the product of width D and thickness T. In this way, a supersonic jet of gas entering cavity 18 can be provided using a reasonable pressure head in inlet passage 24.

Passage 38 and outlet 40 (FIG. 1) have approximately the same cross-sectional area. Passage 38 also has about the same cross-sectional area as passage 24, said area preferably being in the range between 2 times to 20 times the inlet throat area in order to maintain a sufficient pressure head in cavity 18. A gas, such as nitrogen, under a substantially-constant head, is supplied to inlet tube 28. Such gas passes through throat 48 and enters cavity 18. Said gas assumes a particular flow pattern in cavity 18 relative to surface 22, and empties at port 38.

Figure 5:
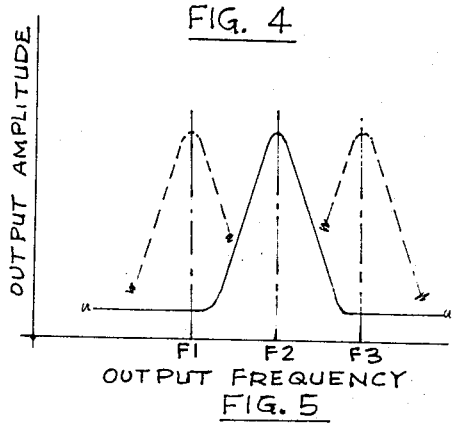
FIG. 5 is a diagram with a curve of output amplitude vs. output frequency.

FIG. 5 illustrates the resonant frequency at which the gas can be made to oscillate with an increased amplitude. At such resonant frequency, oscillator 10 has a highly-amplified, digital-type oscillatory output and has an analog-type input.

One sample of one model of embodiment 10 was charged with clean nitrogen gas using an inlet pressure of 150 p.s.i.a. The velocity of said gas at inlet port 26 was at a supersonic level. The resonant amplitude of the cyclic pressure wave of said gas in cavity 18 measured 2.0 p.s.i. adjacent to port 40 with a frequency of 4.1 kilocycles per second. The corresponding non-resonant amplitude for said gas measured only 0.3 p.s.i.

Figure 6:
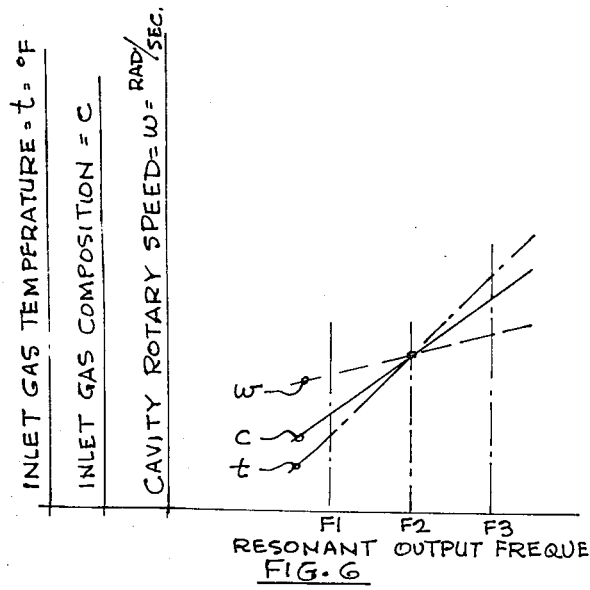
FIG. 6 is a diagram with three curves of inlet gas temperature, inlet gas composition and cavity rotary speed vs. resonant output frequency.

FIG. 6 illustrates that there is a normal peak resonant frequency F2, which can be shifted to a lower frequency F1 or raised to a higher frequency F3 by lowering or raising the inlet gas temperature $t$, or by lowering or raising the inlet gas composition $c$. In addition, the normal peak resonant frequency F2, which occurs at zero rotary speed $w$, can be raised by rotating cavity 18 of oscillator 10 at some definite rotary speed. In this way, oscillator 10 can be used as the basic component of a gas temperature indicator by sensing changes in gas inlet temperature, or can be used as a gas analyzer by sensing changes in gas composition, or can be used as a strapdown rate gyroscope by sensing a rotation of disk 10 relative to the earth about axis 20.

Analytical studies have explained why the aforementioned peak resonant frequency F varies with gas temperature $t$ and also with gas composition $c$. Gas particles in cavity 18 adjacent port 40 have a velocity equal to the speed of sound. It is known that the speed of sound of a gas varies with the gas temperature. In addition, it is known that the speed of sound of a gas varies with the gas composition. The gas composition is here defined as the ratio of the constant-pressure specific heat to the constant-volume specific heat of the gas. Thus, peak resonant frequency F varies with gas temperature $t$ and also with gas composition $c$.

Experimental tests have demonstrated that the aforementioned peak resonant frequency F also varies with the rotary speed $w$ of cavity 18 and disk 10. Such tests show that the gas in cavity 18 has a first flow pattern, which is symmetrical about axis 44 at zero angular speed. Such tests also show that the rotation of cavity 18 about axis 20 at some angular speed causes a second flow pattern, which acts in combination with the aforementioned first flow pattern, in order to increase the aforementioned peak resonant frequency F2. In this way, the peak resonant frequency F varies with the cavity rotary speed $w$.

In summary, this invention provides a gas oscillator 10, in which moving parts are substantially eliminated, in which damages caused by shock loads and vibration loads are substantially avoided, which can be used as the basic component of a gas temperature indicator, which can be used as the basic component of a gas impurity analyzer, which can be used as the basic component of a gyroscope, which can generate an analog-type of input signal, and which can generate a digital-type of output signal.

While the present invention has been described in a preferred embodiment, it will be obvious to those skilled in the art that various modifications can be made therein within the scope of the invention. It is intended that the appended claims cover all such modifications.

What is claimed is:

1. In a fluid oscillator for use as a gas temperature indictator, or as a gas analyzer, or as a gyroscope wherein there is:
   a peripheral wall having a longitudinal axis and having a radially-inner surface with an inlet port located between the peripheral wall and the radially-inner surface and having a neck portion and an opening portion, said opening portion having a larger cross-sectional area than said neck portion and facing radially inwardly; and
   a pair of end walls with respective axially-inner faces which inner faces are substantially flat and substantially parallel to each other together with said peripheral wall forming a resonant cavity, one of said faces having a center portion with at least one outlet port facing axially inwardly, the improvement therein wherein said radially inner surface has a symmetrical profile with an axis of symmetry and the axis of said inlet port intersecting said longitudinal axis substantially at right angles thereto, said outlet port having an axis parallel to said longitudinal axis and intersecting said inlet port axis, providing a symmetrical gas flow pattern in said cavity between said inlet port and said outlet port, minimizing implinging of gas flow on said end faces.

2. A fluid oscillator as claimed in claim 1, in which said cavity has an average thickness between said end walls and said cavity has an average diameter between opposite portions of said radially-inner surface, said average thickness of said cavity being in the range between 1% to 25% of said average diameter of said cavity
   to maintain a flat planar-type of gas flow pattern in said cavity.

3. A fluid oscillator as claimed in claim 2, in which said inlet port has a throat portion with a cross-sectional area of a size in the range between 0.2% to 3.0% of the product of said cavity thickness times said cavity diameter
   to provide a supersonic jet of gas entering said cavity.

4. A fluid oscillator as claimed in claim 3, in which said inlet port and said outlet port have respective cross-sectional areas, each area sized in the range between 2 times and 20 times said inlet throat area
   to maintain sufficient pressure head in said cavity.

5. A fluid oscillator, comprising:
   a peripheral wall,
   a pair of end walls,
   a cavity formed therebetween,
   said peripheral wall having a longitudinal axis and a radially-inner surface,
   said peripheral wall also having an inlet passage means with an inlet port connecting to said cavity,
   said peripheral wall also having an inlet tube connecting to said inlet passage for supplying said cavity, said tube having a seal means to minimize leakage therefrom,
   said end walls respectively having axially-inner end faces, one of said end walls having a center portion with a passage means with an outlet port connecting to said cavity, and said end wall also having an exterior outlet tube connecting to said passage for flow from said cavity,
   said cavity having an average thickness between said end faces and having an average width between opposite portions of said radially-inner surface,
   said inlet port having an inlet axis and having an opening portion through said radially-inner surface and having a throat portion of smaller cross-sectional area than said opening portion,
   said throat having a cross-sectional area with a size smaller than 3% of the product of said cavity width times said cavity thickness,
   said outlet passage having about the same cross-sectional area as said inlet passage with said cross-sectional area being not more than 20 times said inlet throat area.

References Cited

UNITED STATES PATENTS

| | | | |
|---|---|---|---|
| 3,158,166 | 11/1964 | Warren | 137—81.5 |
| 3,238,958 | 3/1966 | Warren et al. | 137—81.5 |
| 3,267,946 | 8/1966 | Adams et al. | 137—81.5 |
| 3,275,015 | 9/1966 | Meier | 137—81.5 |
| 3,276,464 | 10/1966 | Metzger | 137—81.5 |
| 3,290,947 | 12/1966 | Reilly | 137—81.5 XR |
| 3,302,398 | 2/1967 | Taplin et al. | 137—81.5 XR |
| 3,311,120 | 3/1967 | Palmisano | 137—81.5 XR |

SAMUAL SCOTT, *Primary Examiner.*